United States Patent
Braitmaier et al.

(10) Patent No.: US 7,281,760 B2
(45) Date of Patent: Oct. 16, 2007

(54) METHOD AND DEVICE FOR ADJUSTING A VEHICLE RECLINING SEAT

(75) Inventors: Klaus Braitmaier, Herrenberg (DE); Hans-Dieter Multhaupt, Stuttgart (DE); Bernd Schmidt, Wildberg-Sulz (DE)

(73) Assignee: DaimlerChrysler AG, Stuttgart (DE)

( * ) Notice: Subject to any disclaimer, the term of this patent is extended or adjusted under 35 U.S.C. 154(b) by 17 days.

(21) Appl. No.: 10/481,606

(22) PCT Filed: May 4, 2002

(86) PCT No.: PCT/EP02/04905

§ 371 (c)(1),
(2), (4) Date: Aug. 4, 2004

(87) PCT Pub. No.: WO03/000516

PCT Pub. Date: Jan. 3, 2003

(65) Prior Publication Data

US 2004/0251728 A1    Dec. 16, 2004

(30) Foreign Application Priority Data

Jun. 23, 2001    (DE) .............................. 101 30 413

(51) Int. Cl.
*B60N 2/34*    (2006.01)
(52) U.S. Cl. .................. 297/64; 297/111; 297/233; 297/354.13
(58) Field of Classification Search .................. 297/15, 297/63, 64, 66, 239, 290, 293, 108, 111, 354.13, 297/257, 244, 234, 233; 296/64, 65.16
See application file for complete search history.

(56) References Cited

U.S. PATENT DOCUMENTS

| | | | |
|---|---|---|---|
| 1,316,007 A * | 9/1919 | Waller | 297/66 |
| 1,582,500 A * | 4/1926 | Bahr | 297/354.13 |
| 2,576,343 A | 11/1951 | Hibbard et al. | 155/7 |
| 3,934,928 A * | 1/1976 | Johnson | 297/71 |
| 4,065,174 A * | 12/1977 | Yokohama et al. | 297/66 |
| 4,467,252 A * | 8/1984 | Takeda et al. | 318/603 |
| 4,669,780 A * | 6/1987 | Sakakibara et al. | 297/257 |
| 5,954,298 A | 9/1999 | Basuthakur et al. | 244/163 |
| 5,954,398 A | 9/1999 | Namba et al. | 297/257 |
| 6,441,576 B1 | 8/2002 | Marin-Martinod et al. | 318/568.1 |
| 6,820,911 B2 * | 11/2004 | Furui | 296/65.01 |

FOREIGN PATENT DOCUMENTS

EP        1 103 412        11/2000

* cited by examiner

*Primary Examiner*—Anthony D. Barfield
(74) *Attorney, Agent, or Firm*—Crowell & Moring LLP

(57) ABSTRACT

A method and a device are provided for adjusting a vehicle reclining seat which can be moved together into a resting position, the backrest of a front passenger seat being able to be folded downward to the rear and forming a resting surface together with a backseat. Provision is made for the front passenger seat and the rear seat to be movable automatically into a resting position and back into the seating position.

13 Claims, 2 Drawing Sheets

METHOD AND DEVICE FOR ADJUSTING A VEHICLE RECLINING SEAT

BACKGROUND AND SUMMARY OF THE INVENTION

The invention relates to a method and a device for adjusting a vehicle resting seat which can be moved together into a resting position, the backrest of the front passenger seat being able to be folded down rearward and forming a resting surface together with the backseat of the rear seat.

A vehicle resting seat of the generic type is disclosed, for example, in U.S. Pat. No. 5,954,298. In order to adjust the vehicle resting seat, the back of the front seat is inclined rearward and brought into a position in front of the backseat. This backrest of the front seat then forms a resting surface together with the two seat surfaces of the front and of the rear seat, the backrest of the backseat continuing to remain upright as a backrest. The user can also sit down quite normally on the rear seat and place his legs on the backrest of the front seat. In order to adjust this reclining surface, a mechanical device which enables the backrest of the front seat to be folded down is provided.

A disadvantage of this type of vehicle seat is that the adjustment takes place mechanically. The folding over of the backrest requires muscular power, or, at any rate, dexterity by the person wishing to use the reclining seat and also wishing to bring it back into its original position. The adjustment is associated with an unpleasant effort for the user, with the result that he will set and use the reclining seat position only in special situations.

The object of the invention is, therefore, to simplify a method and a device for adjusting a vehicle seat in such a manner that the vehicle reclining seat can be easily adjusted without great effort.

According to the invention, the object is achieved by adjusting a vehicle reclining seat which can be moved together into a resting position, the backrest of the front passenger seat being able to be folded down rearward and forming a resting surface together with the backseat of the rear seat, comprising automatically moving the front passenger seat and the rear seat into a resting position and back into the seating position. Advantageous variants and developments of the subject matter of the invention are characterized by the features of the subclaims.

A substantial advantage of this method and of this device for adjusting a vehicle reclining seat is that a reclining seat for resting on can be provided in vehicles of normal size, it being possible for the seats to be easily brought by anybody into the resting position and also back again into the conventional seating position. The possibility of providing a reclining seat for an occupant to rest on conventionally exists only in large, luxury vehicles. Owing to the fact that the seats conventionally arranged in the vehicle are used, the reclining seat can be fitted in vehicles in the top class segment. It is precisely in this sphere that the simple adjustment of a resting seat is desired, for example in order to rest in the vehicle at a freeway rest station or, in general, in order to insert a short break in a relatively long journey, in which the feet can be put up and a resting position assumed for a period. For this purpose, it is advantageous if the vehicle resting seat can be brought without great effort into its resting position and also back into the normal seating position to continue the journey. The resting seat may be used for occasionally overnighting in the vehicle. A resting seat of this type is a selling point which a customer will prefer over a conventional vehicle when selecting a vehicle.

The invention will be explained in greater detail with reference to an exemplary embodiment in conjunction with a description of the drawing figures.

DETAILED DESCRIPTION OF THE DRAWINGS

Figure 1:
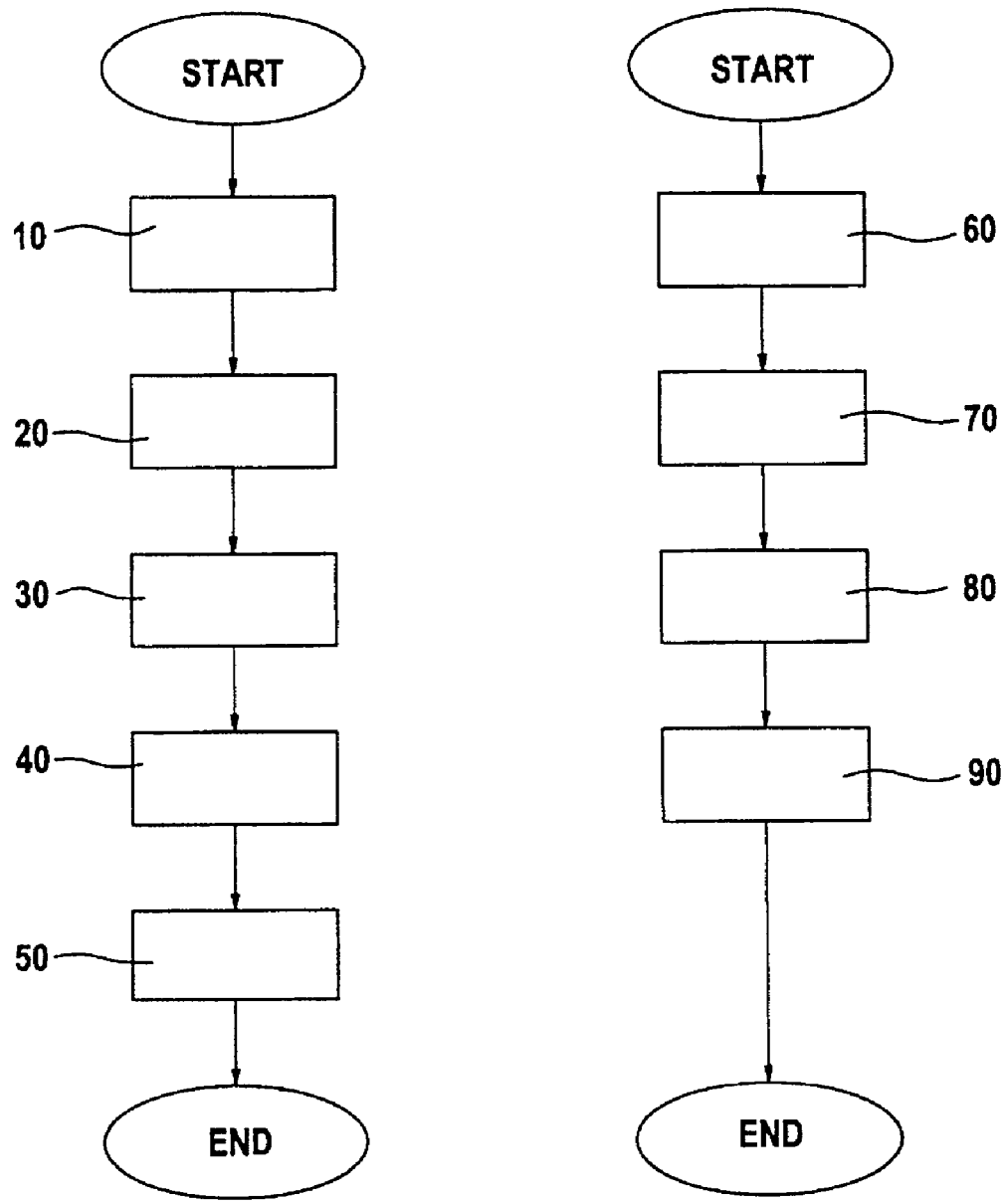
FIG. 1 shows a schematic illustration of the method sequence.

FIG. 1 shows a schematic illustration of a method sequence for adjusting a vehicle resting seat. The left-hand method sequence shows how the front passenger seat and the rear seat can be moved automatically into a resting position, and the right-hand method sequence shows how the front passenger seat and the rear seat can be moved again back to the seating position. The method steps show the activities which have to be carried out by the user in order for the automatic function to carry out the desired maneuvers.

Figure 3:
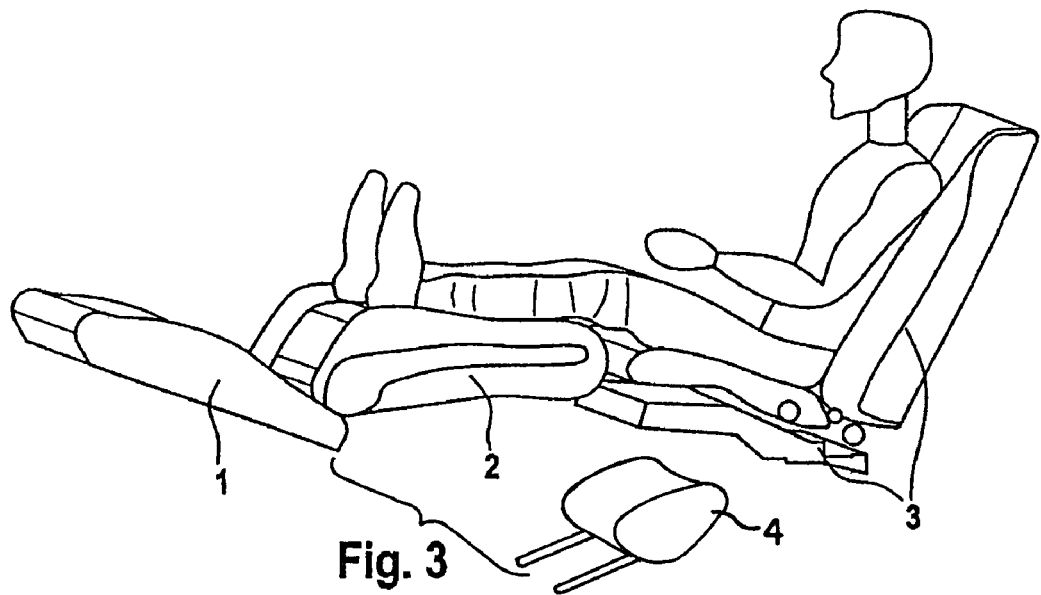
FIG. 3 shows a schematic illustration of a control of a seat-adjusting device.

The resting position is set in the left-hand method sequence by at 10 first of all a "seat adjustment" changeover switch for the front passenger seat/rear seat being set to move to the resting position, then, at 20, the resting position button being operated, so that the rear seat moves with adjustment of the backrest cushion and seat cushion into the rear position, the front passenger seat moves into the resting position until the front passenger backrest is at an angle of approximately 30° with respect to the plane, the front passenger head restraint moves into the uppermost position, the sequence stops so that, at 30, the head restraint 4 can be removed (as shown in FIG. 3), at 40 the legs have to be pivoted to the rear center, at 50 the resting position button is operated again, so that the front passenger seat and right rear seat move completely into the resting position.

The seating position is reset in the left-hand method sequence by at 60 first of all a "seat adjustment" changeover switch for the front passenger seat/rear seat being set to leave the resting position, at 70 the resting position button being operated, so that the conventional seating position is moved to, in which at 80 the front passenger head restraint can be fitted by the user, at 90 the resting position button is operated again, so that the originally set positions of the front passenger seat and rear seat are moved to.

Figure 2:
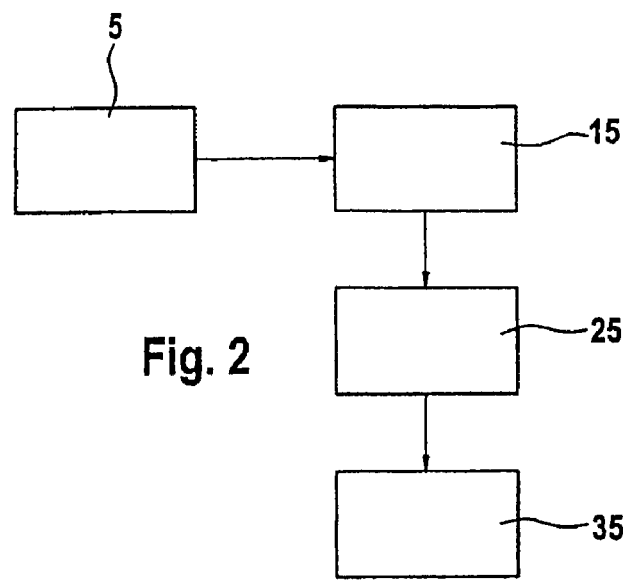
FIG. 2 shows a schematic illustration of a vehicle resting seat.

FIG. 2 shows a schematic illustration of a control for adjusting the vehicle resting seat. In order to adjust the vehicle resting seat, a motorized drive 25 which drives a front-passenger-seat and rear-seat adjusting means 35 and which obtains the required adjustment signals from a control unit 15 is provided. A front-passenger-seat and a rear-seat adjusting device 35 is provided, the front-passenger-seat adjusting device only adjusting the front-passenger and the rear-seat adjusting device only adjusting the rear seat. In contrast, the control unit 15 obtains signals from the operating elements 5 which are arranged for operation in the vehicle interior. These signals cause the control unit 15 to activate the motorized drive 25 in accordance with characteristic curves stored in said control unit. This motorized drive 25 moves the backrest cushion and seat cushion of the rear seat into the rear position, in accordance with the left-hand method sequence in FIG. 1, and moves the front passenger seat into the resting position by lowering the backrest.

FIG. 3 shows a schematic illustration of the setting of a seat-adjusting device. Operating elements (not shown here) such as the "seating position" changeover switch button for changing over the setting from reclining position and seating position and the "reclining position" button for activating the method sequences, according to FIG. 1, are arranged in the vehicle interior. In order to adjust the vehicle resting seat, a motorized drive 25 is provided which drives a front-passenger-seat and a rear-seat adjusting device 35 and which obtains the necessary adjustment signals from a control unit 15. In contrast, the control unit 15 obtains signals from the operating elements 5 which are arranged for operation in the vehicle interior. These signals cause the control unit 15 to activate the motorized drive 25 in accordance with characteristic curves stored in said control unit. This motorized drive 25 moves the backrest cushion and seat cushion of the rear seat 3 into the rear position in order to set the resting position. The front passenger seat 1 is moved into the resting position by lowering the backrest 2. The occupant can now comfortably sit down on the rear seat 3 and place his legs on the backrest 2 of the front passenger seat 1.

In the case of relatively small vehicles, the backrest of the front seat may also come to lie on the seat cushion of the backseat. The resting surface is then formed by the seat cushion and the backrest of the front seat. The backrest of the backseat is retained as a backrest in the resting position.

The invention claimed is:

1. A method for adjusting a vehicle reclining front passenger seat which can be moved together with a rear seat from an original position into a resting position in which a backrest of the front passenger seat is folded down rearward to form a resting surface together with a seat cushion of the rear seat, comprising:
   automatically moving the backrest of the front passenger seat to a selected angle, moving the rear seat into a rear position, and stopping movement of the backrest of the front passenger seat at the selected angle,
   removing a front passenger seat head restraint from the backrest of the front passenger seat once said movement is stopped,
   automatically moving the front passenger seat and the rear seat completely into the resting position with the front passenger seat head restraint removed, and
   moving the front passenger seat back into a seating position.

2. The method for adjusting a vehicle reclining seat as claimed in claim 1, wherein activation of the resting position and the deactivation of the resting position, producing movement of the front passenger seat and the rear seat back into the seating position, take place under operation by the occupant.

3. A method according to claim 2, wherein the selected angle is an angle of approximately 30° with respect to a plane, and wherein the front passenger and rear seats move completely into the resting position after a passenger's legs are pivoted.

4. A method according to claim 2, wherein moving the front passenger seat and the rear seat back includes automatically moving the front passenger seat into a conventional seating position, refitting the front passenger seat head restraint, and moving the front passenger seat and rear seat to the original position.

5. The method for adjusting the vehicle reclining seat as claimed in claim 1, wherein the selected angle is an angle of approximately 30° with respect to a plane, and wherein the front passenger and rear seats move completely into the resting position after a passenger's legs are pivoted.

6. The method for adjusting the vehicle reclining seat as claimed in claim 1, wherein moving the front passenger seat and the rear seat back includes automatically moving the front passenger seat into a conventional seating position, refitting the front passenger seat head restraint, and moving the front passenger seat and rear seat to the original position.

7. A device for carrying out the method as claimed in claim 1 comprising the front passenger seat and the rear seat, wherein a front-passenger-seat and rear-seat adjusting device is driven by motor and brings the front passenger seat and the rear seat automatically into the resting position and back again into the seating position.

8. The device as claimed in claim 7, wherein an operating element for activating the resting and seating positions is provided.

9. The device as claimed in claim 8, wherein an operating element is provided for setting the conventional seating position and leaving the resting position, and setting the resting position.

10. The device as claimed in claim 8, wherein a control unit which obtains signals from operating elements outputs adjustment signals in accordance with stored characteristic curves to a motorized drive.

11. The device as claimed in claim 7, wherein an operating element is provided for setting the conventional seating position and leaving the resting position, and setting the resting position.

12. The device as claimed in claim 11, wherein a control unit which obtains signals from operating elements outputs adjustment signals in accordance with stored characteristic curves to a motorized drive.

13. The device as claimed in claim 7, wherein a control unit which obtains signals from operating elements outputs adjustment signals in accordance with stored characteristic curves to a motorized drive.

* * * * *